(Model.)
R. HOFFHEINS.
SEED PLANTER.
No. 254,818.  Patented Mar. 14, 1882.
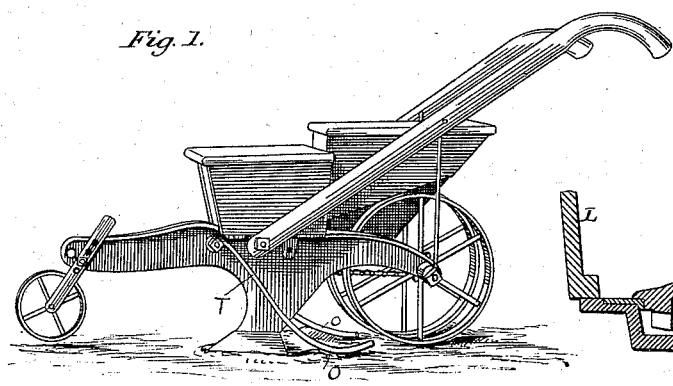
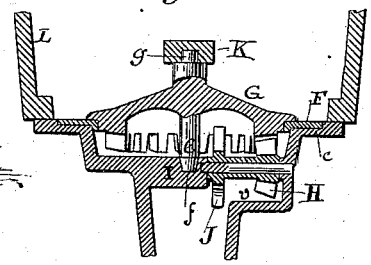
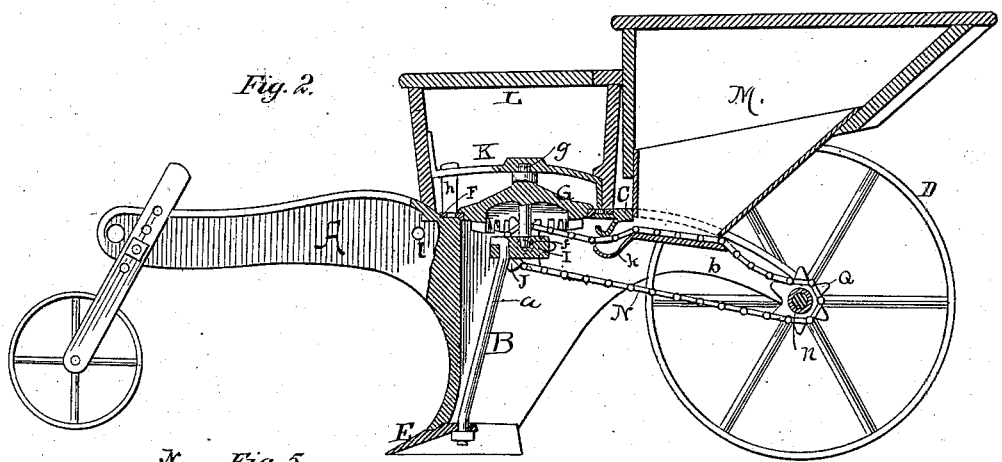
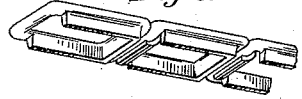
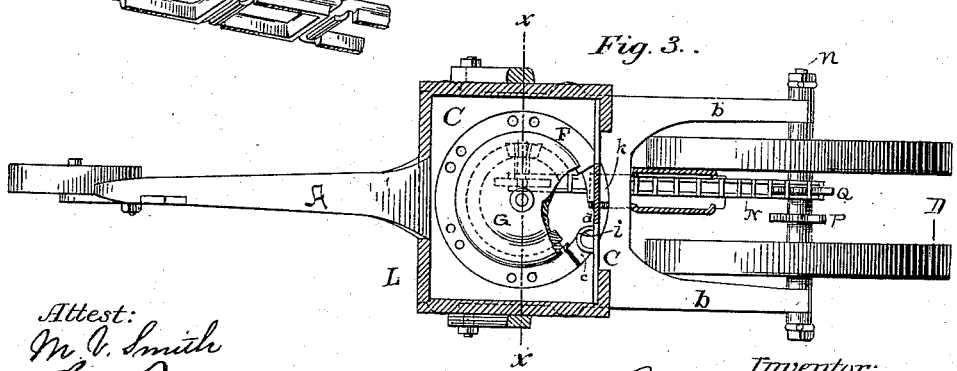
Attest:
M. V. Smith
Levi Bacon
Inventor:
Reuben Hoffheins
By his atty R. D. Smith (Model.)
R. HOFFHEINS.
SEED PLANTER.
No. 254,818. Patented Mar. 14, 1882.
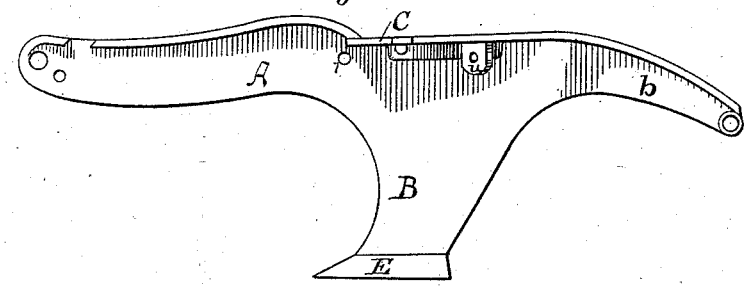
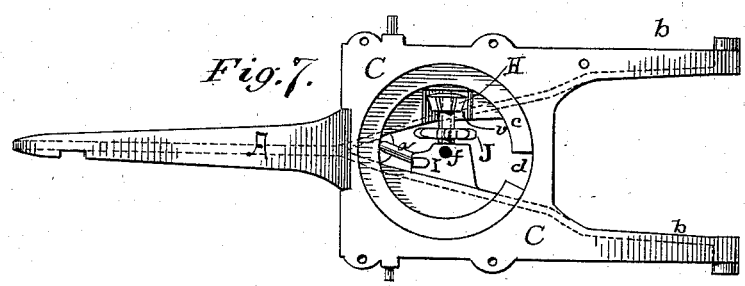
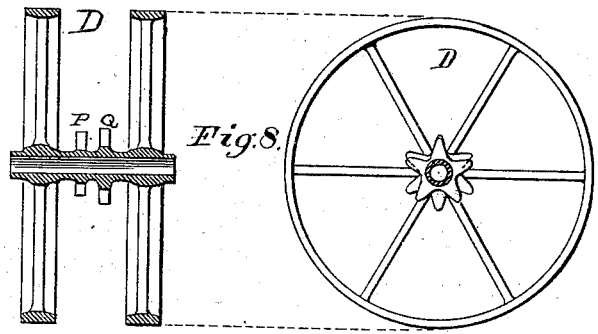
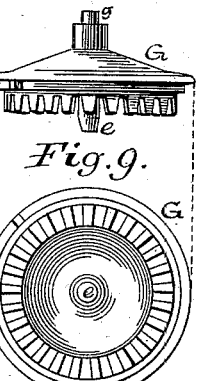
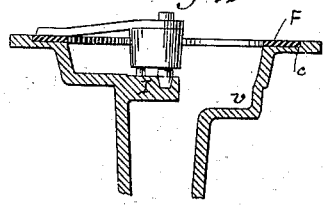
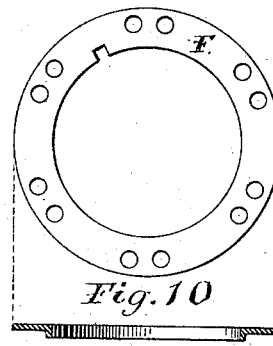
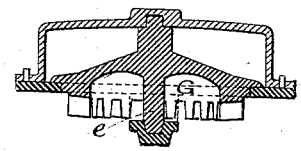
3 Sheets—Sheet 2.

(Model.)

R. HOFFHEINS.
SEED PLANTER.

No. 254,818. Patented Mar. 14, 1882.

Attest:
M. V. Smith
Geo. Bacon

Inventor:
Reuben Hoffheins
By his Atty R. D. Smith

UNITED STATES PATENT OFFICE.

REUBEN HOFFHEINS, OF YORK, PENNSYLVANIA.

SEED-PLANTER.

SPECIFICATION forming part of Letters Patent No. 254,818, dated March 14, 1882.

Application filed January 22, 1881. (Model.)

*To all whom it may concern:*

Be it known that I, REUBEN HOFFHEINS, of York, in the county of York and State of Pennsylvania, have invented a new and useful Improvement in Seed-Planters and Attachments therefor, whereby it may be adapted to the following uses in connection with planting and cultivating seeds: first, harrowing and cultivating the ground; second, planting corn, cotton, and other seeds in a single row; third, distributing fertilizers therewith; fourth, planting corn, wheat, barley, or other seeds in drills; fifth, cultivating the rows; sixth, scraping and hilling.
The principal part of my machine is the beam, frame, and standard, which are constructed with reference to the attachment of the other parts necessary and effective in the various purposes above set forth.
The first part of my invention relates to the frame, beam, and standard, and the structure of the same, with the parts permanently related to it; and it consists, first, in the structure of the beam, standard, frame, and bed-plate; second, in certain permanently-related bearing-surfaces cast upon "chills," so that said surfaces will come from the mold true and smooth and adapted to receive the parts intended to work upon said surfaces; third, in the structure of the rear bearing-wheel.

For the sake of convenience, I will describe the first part of my invention before I describe the related parts which are to be placed upon and coact with it.
A principal object of my invention is to construct a seeding-machine with the fewest possible number of parts, and so formed in the casting as to require no fitting and finishing before being assembled and put into operative condition.

Figure 13:
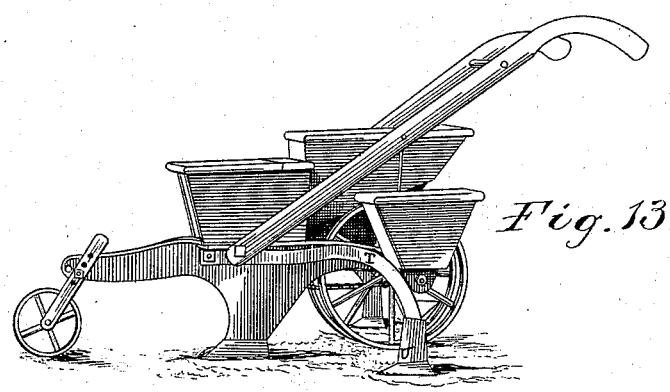
Figure 14:
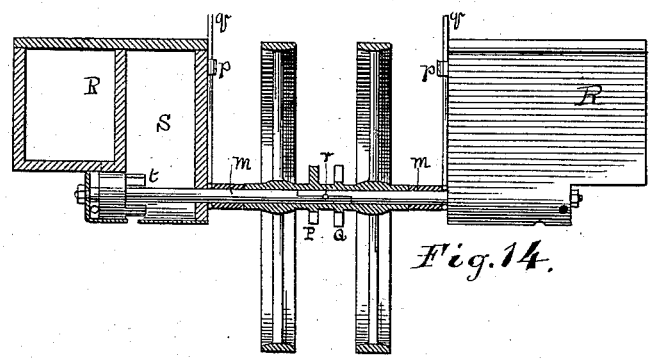
Figure 15:
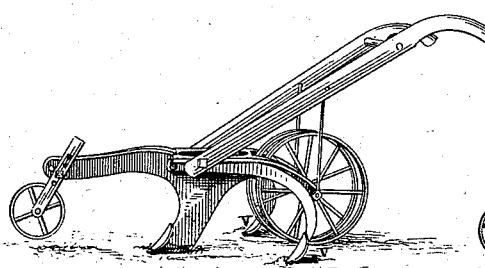
Figure 16:
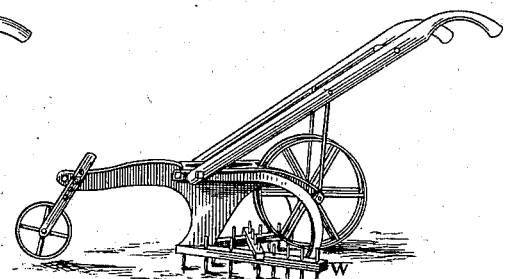
Figure 17:
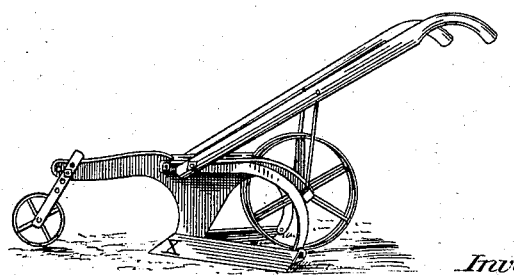

That others may fully understand my invention, I will particularly describe its several parts, having reference to the accompanying drawings, wherein—
Figure 1 is a perspective of my machine arranged for planting corn and a fertilizer. Fig. 2 is a vertical longitudinal section of the same. Fig. 3 is a sectional plan of the same. Fig. 4 is a vertical central section through the feeding apparatus. Fig. 5 is a perspective of my drive-chain and fertilizer-feeder. Fig. 6 is a side elevation of the beam. Fig. 7 is a plan of the same. Fig. 8 exhibits the main wheel in section and elevation. Fig. 9 exhibits the crown-wheel in plan and elevation. Fig. 10 represents the feed-cup ring. Figs. 11 and 12 represent the chills in position. Fig. 13 represents the planter with drill and seeder attachments. Fig. 14 is a transverse section through the axis of the main wheel, showing the method of mounting said attachments. Figs. 15, 16, 17 represent various attachments in position.

A is the beam. B is the standard or boot, and C is the bed plate or frame, provided with two rearwardly-extended arms, $b$ $b$, which support the bearings for the rear wheel, D. These parts—viz., beam, standard, and frame—may be cast integral in a single piece, though it is evident one or another of them may be cast separately and afterward united to the main part by bolts. To cast either of said parts separately would augment expense without changing the essential character of this part of my invention. The share E may be included with the parts cast together; but I do not usually so include it, because it is generally desirable that the share shall be removable.

The frame or bed-plate C consists of a horizontal plate upon the top of the boot or standard, adapted to receive the feed-ring and crown-wheel of the corn-planter, and bearings for the same and for the sprocket-wheel shaft, whereby motion is transmitted from the wheel D to the feed-ring. The said plate C may have forward and rear extensions or flanges along the top of the beam A and the arms $b$ $b$, to give them strength laterally, though, if preferred, these parts may be strengthened in other well-known ways.

The standard B is formed with two plates or sides, united at their front edge and diverging backward, forming a boot or chute, through which the corn, &c., may drop when discharged. The share E is attached to the lower end of said boot by a single bolt, $a$, which passes upward from the share to the lug, which forms one bearing for the sprocket-wheel shaft.

A circular recessed seat, $c$, for the feed-ring F is formed in the upper surface of said bed-plate by casting the same on a chill-ring, whereby said seat is produced in said plate with such accuracy and smoothness of surface that no further finishing is necessary. At a proper point a notch, d, is made in said seat to permit the seeds carried by the feed-ring to fall through. The feed-ring F is likewise cast upon a chill, and is provided with a suitable number of holes or cells for the reception of the seed, and is thereby so accurately fitted to its seat c that no further finishing is required. The feed-ring F is rotated by a revolving cap or crown-wheel, G, which at its periphery fits the feed-ring F, and at its center is provided with a stud, e, which rests in a step, f, in the lug I. The under surface of the cap or crown-wheel G is provided with gear-teeth, which mesh with the pinion H on the shaft of the sprocket-wheel J, and said pinion and sprocket-wheel are housed in a recess, v, cast in the side of the boot B. The bearing-edge of the cap G and the point of the stud e are cast on a chill, and are thereby made relatively true and also durable. The chill which forms the mold for the feed-ring seat has also a central stud, which forms a chill for the socket f of the axis-stud e. This chill is shown in position in Fig. 11. The upper pivot or bearing, g, of the cap or crown-wheel G is in a socket formed in the bar K, which extends across the interior of the hopper L. This bar, at its front, has a pendent brush or flexible scraper, h, to remove the excess of seeds from the cells of the seed-ring as they pass, and at the back it has a guard-plate, i, beneath which the edge of the seed-ring passes before delivering the contents of the feed-cells. The crown-wheel and feed-ring are driven from the wheel D by means of a chain, N, which runs on the sprocket J. By this arrangement the driving devices are entirely below the hopper.

The second part of my invention refers to the parts attached to the foregoing to constitute a seeding and fertilizer-distributing machine. To complete the apparatus for planting corn, nothing is required but a hopper, L, secured to the frame or bed-plate C above the feeding-ring, to hold the corn or other grain.

When it is desired to distribute fertilizer at the same time that seed is planted a hopper, M, is mounted behind the seed-hopper, and the sprocket-chain N is caused to pass forward through the bottom of said hopper, and thereby each link of said chain becomes a feeder to remove and carry forward portions of the fertilizer and deliver it downward through the boot B to the ground. For this purpose, if necessary, the links of said chain may be increased in thickness, as shown in Fig. 5, so as to gather and remove a greater or less quantity of fertilizers, as may be required. By this means the driving-chain for the seeder becomes the feed-chain for the fertilizer also. As the feed-chain N passes out of the fertilizer-hopper it delivers all or a part of its load upon a feeder-chute, k, which extends forward from the hopper for that purpose. The feeder-chute is provided with a side delivery, so that the fertilizer as it falls off will be discharged in a lateral direction, and will therefore fall clear from the returning part of the chain.

The share E opens the furrow and the feeding devices cause the seed and fertilizer to be dropped therein, and scrapers O, attached at their front ends to the standard or beam, draw the earth back into the furrow to cover the seed.

The scrapers O are attached to the standard or beam by a single bolt, which passes through a hole, l, in said beam, formed by a core in the mold when the same was cast.

The sprocket J, beneath the hopper, has six teeth, and the sprockets P Q, upon the rear wheel-hub, have five and six teeth, respectively, so that by reversing the wheel D the chain and feed may be driven at correspondingly different speeds to vary the distance between the hills.

The wheat-drill hoppers R are mounted upon the distributer-shafts m, and said shafts are adapted to take the place of the axis-bolt n, and being then keyed fast to the hub of the wheel D, they, with the distributers within the hopper, turn with said wheel. Each hopper is provided with a clip, p, which may be attached to the handle-brace q to keep the hopper upright while in use. I find it convenient to scarf or halve the adjoining ends of the axles m, so that when they are inserted in the hub of the wheel D they will lap past each other, and may then both be secured by a single key-pin, r, as shown in Fig. 14. Each seed-hopper may be provided with a separate compartment, S, and distributer t for fertilizer.

At each side of the plate C there is a pendent lug, u, adapted to receive and hold the forward end of one of the arms T, which serve as braces or supports, to which may be attached the shares and boots U, to open the furrows for seed delivered from the hoppers R, which are attached when grain is to be drilled, as shown in Fig. 13.

In place of the shares and boots the arms may also bear at their lower ends removable cultivator-teeth V, whereby the implement may be adapted to the ordinary uses of a cultivator, as shown in Fig. 15. At such time, also, a tooth may be placed on the standard B, instead of the share E.

By removing the teeth V a harrow, W, may be attached to the standard and to the arms, as shown in Fig. 16; or, instead of a harrow, a scraping-hiller, X, may be employed when such an implement may be used appropriately.

Having described my invention, what I claim as new is—

1. In a seeding-machine, the beam A, frame or bed-plate C, with its central opening and seat for the feed-ring, standard B, and wheel-arms b, all cast integral in one piece.

2. In a seeding-machine, the standard B and bed-plate C, with its circular opening for the feed-ring and crown-wheel, and the lug I, projecting laterally from the side of the standard across and below said opening, and provided with a step-socket, all cast integral in a single piece.

3. The bed-plate and hopper, with the feed-ring and the driving-pinion and sprocket, the latter located close to the axis of said ring, combined with the crown-wheel G, concave on its under side to admit and cover the sprocket, and in engagement with said pinion and feed-ring to communicate motion from one to the other, substantially as set forth.

4. The bed-plate or frame C, provided with the chilled seat $c$ and socket $f$, all cast integral in one piece, as set forth.

5. The double-rim open-web or spoked wheel D, with its tubular hub, all cast integral in one piece, as set forth.

6. The seed-hopper L and the phosphate or fertilizer hopper M, placed between said hopper L and the supporting-wheel D, combined with the sprocket-chain N, which drives the seed-feeding devices, and is also arranged to pass through said hopper M at its bottom, to feed the fertilizer, as set forth.

7. The fertilizer-hopper M and the feeding-chain N, combined with the side-delivery feeder-chute at the discharge-opening of the fertilizer-hopper, to cause the fertilizer to fall toward the side clear from the returning part of the feed-chain, as set forth.

8. In a seeding-machine, the seed-hopper and its feeding devices and the supporting-wheel D, combined with the hoppers mounted upon the axle of said supporting-wheel, and their distributers operated thereby, whereby seeds may be simultaneously dropped in three rows.

9. For a seeding-machine, a beam-standard or boot, frame or bed-plate, and wheel-arms provided with lugs, bearings, seats, and bolt-holes for attachment of parts, all substantially as shown and described herein, cast integral and completed in a single piece.

REUBEN HOFFHEINS.

Witnesses:
GEORGE M. SHETTER,
WM. L. HOFFHEINS.